(12) United States Patent
Tang et al.

(10) Patent No.: US 11,801,758 B2
(45) Date of Patent: Oct. 31, 2023

(54) METHOD AND APPARATUS FOR CONTROLLING DISTRIBUTED PROPULSION SYSTEMS

(71) Applicants: Xidong Tang, Troy, MI (US); Kaitlyn M Hao, Troy, MI (US); Christine C Zeng, Sterling Heights, MI (US)

(72) Inventors: Xidong Tang, Troy, MI (US); Kaitlyn M Hao, Troy, MI (US); Christine C Zeng, Sterling Heights, MI (US)

( * ) Notice: Subject to any disclaimer, the term of this patent is extended or adjusted under 35 U.S.C. 154(b) by 201 days.

(21) Appl. No.: 17/456,633

(22) Filed: Nov. 27, 2021

(65) Prior Publication Data

US 2023/0166602 A1    Jun. 1, 2023

(51) Int. Cl.
*B60L 15/00* (2006.01)
*B60L 15/20* (2006.01)
*B60L 3/00* (2019.01)

(52) U.S. Cl.
CPC ............. *B60L 15/20* (2013.01); *B60L 3/0061* (2013.01)

(58) Field of Classification Search
CPC ........ B60L 15/20; B60L 15/32; B60L 3/0061; B60L 3/0084; B60L 3/0092; B60L 3/12; B60L 3/0023; B60L 2220/42; B60L 2260/40
See application file for complete search history.

(56) References Cited

U.S. PATENT DOCUMENTS

| | | | | |
|---|---|---|---|---|
| 6,654,910 B1 * | 11/2003 | Eibach | ............... | G05B 19/0428 714/37 |
| 6,766,230 B1 * | 7/2004 | Rizzoni | .............. | G05B 23/0251 701/32.9 |
| 10,800,264 B2 * | 10/2020 | Liu | ....................... | G05D 1/0088 |
| 11,707,990 B2 * | 7/2023 | Mamarelis | .............. | B60L 15/20 701/22 |
| 11,710,030 B2 * | 7/2023 | Mody | .................... | G06N 3/063 706/15 |
| 2007/0138986 A1 * | 6/2007 | Kutsuna | ................. | B60K 6/365 318/400.21 |
| 2008/0033693 A1 * | 2/2008 | Andenna | ............ | G05B 23/0221 702/179 |
| 2009/0295559 A1 * | 12/2009 | Howell | ............. | B60W 50/0205 340/459 |
| 2018/0272892 A1 * | 9/2018 | Monkhouse | .......... | B60W 30/02 |
| 2019/0359153 A1 * | 11/2019 | Bachmeier | ............... | G07C 5/02 |
| 2022/0274488 A1 * | 9/2022 | Spjuth | ..................... | B60L 58/20 |
| 2022/0417792 A1 * | 12/2022 | Winder | ................. | H04L 1/0061 |
| 2023/0229757 A1 * | 7/2023 | Dastidar | ............. | G06F 9/45558 726/1 |
| 2023/0234473 A1 * | 7/2023 | Gannamaneni | ......... | B60L 58/20 701/22 |

* cited by examiner

*Primary Examiner* — Phutthiwat Wongwian
*Assistant Examiner* — Sherman D Manley
(74) *Attorney, Agent, or Firm* — William C. Lin, PLC

(57) ABSTRACT

A hierarchical vehicle control system for a vehicle powered by a distributed propulsion system (DPS) comprising plurality of propelling axles driven by plurality of motors and powered by a battery system comprising plurality of battery packs. Said hierarchical vehicle control system comprising a first controller, a second controller that generates axle command signals for operation of the propelling axles, and a third controller that generates motor command signals for operation of the electric motors wherein said third controller further comprising a DPS diagnosis/prognosis module, a DPS fault tolerance module and a power distribution management module.

15 Claims, 9 Drawing Sheets

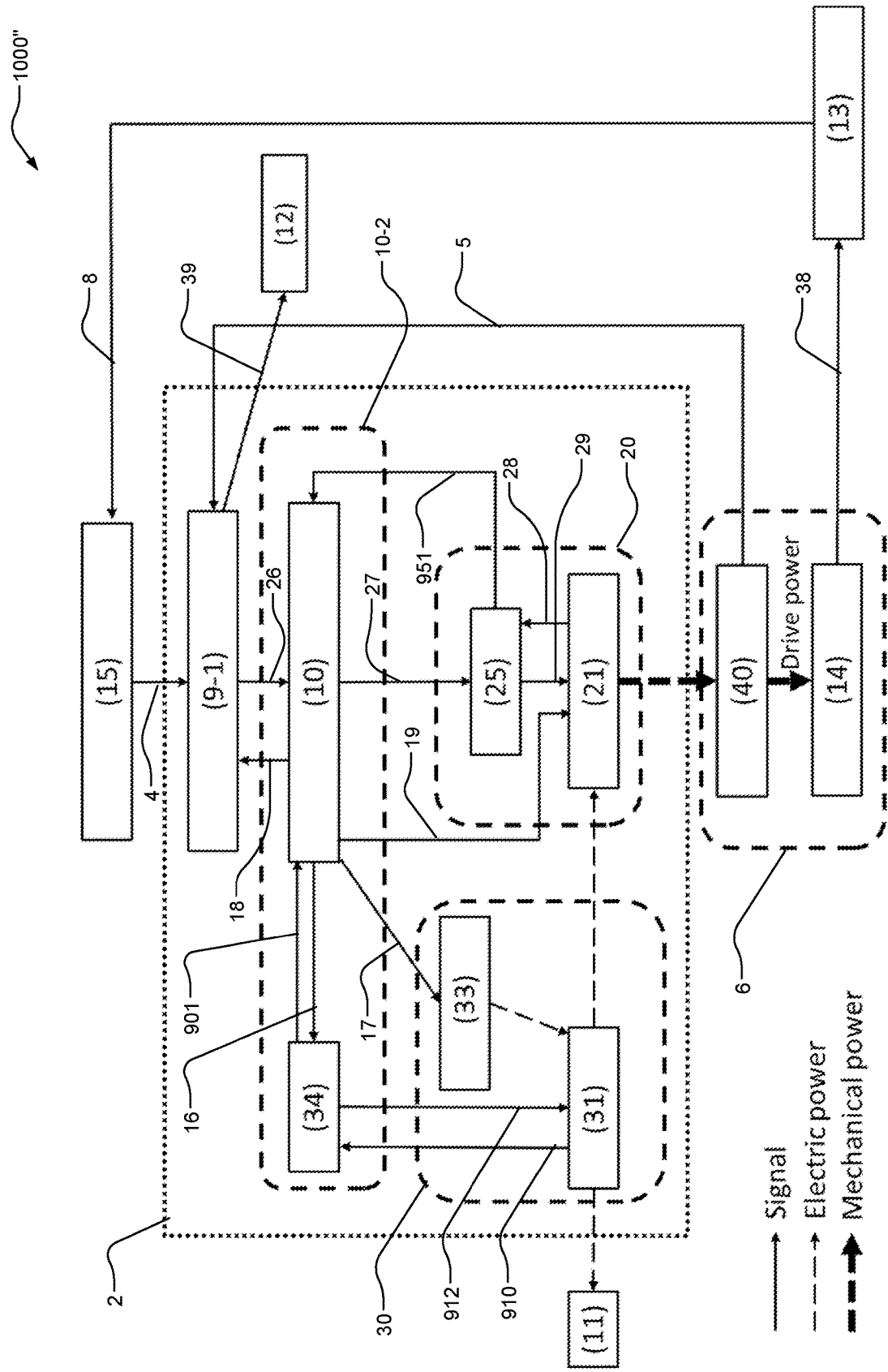

METHOD AND APPARATUS FOR CONTROLLING DISTRIBUTED PROPULSION SYSTEMS

FIELD

The present invention relates to vehicle propulsion systems, and more particularly to structure and operation of a distributed electric propulsion system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Distributed electric propulsion systems are widely used for various applications, such as aircraft, automotive, marine, locomotive. For transportation system safety and reliability, such distributed electric drive systems are to be designed to have inherent redundancy, for example, multiple electric motors driving one final shaft associated with multiple batteries as redundant power sources.

In state of the art, a vehicle level controller such as a flight controller or a vehicle controller is a centralized controller to deal with vehicle control as well as manage an electric propulsion system whether the system is centralized or distributed. For example, the state-of-the-art flight controller handles aircraft attitude control and pilot control, and meanwhile it calculates the commands to the electric propulsion system to meet the goals of attitude control and pilot control. The centralized flight controller collects information from distributed subsystem controllers such as battery management controllers and motor controllers via in-vehicle networks such as CAN. The flight controller processes the information and sends commands to the subsystem controllers. Such centralized control architecture results in lower reliability and less redundancy than distributed control architecture, because the centralized control architecture cannot fully utilize the redundancy introduced by distributed propulsion systems. Moreover, with the increasing complexity of the distributed electric propulsion system, a specific controller to optimize and manage the distributed electric propulsion system is necessary in order to reduce the workload of the vehicle level controller and simplify the development and realization of the vehicle level controller.

The purpose of inventing such a power control unit or function and its controller is to optimize the Distributed propulsion systems (DPS) performance and improve safety and reliability of DPS to meet the ASIL-D requirement.

SUMMARY

The disclosure describes a hierarchical vehicle control system for a vehicle. This vehicle is equipped with a sensory system and powered by a distributed propulsion system (DPS). The DPS includes a plurality of propelling axles, each of the axles is driven by an electric motor of a motor system. This system with multiple motors is powered by a battery system which consists of multiple battery packs. The vehicle sensory system generating vehicle and environmental signals. The disclosed hierarchical vehicle control system includes a first controller, a second controller and a third controller in respective control hierarchy. The second controller generates axle command signals for operation of the propelling axles. The third controller generates motor command signals for operation of the electric motors.

In this hierarchical control structure, the first controller receives the vehicle and environmental signals. The second controller is electrically connected with the first controller so it can receive the vehicle command signals from the first controller. The second controller generates the axle command signals based on the vehicle command signals. The third controller is electrically connected with the second controller so as to receive the axle command signals. The third controller generates the motor command signals based on the axle command signals. The third controller contains a DPS diagnosis/prognosis module, a DPS fault tolerance management module and a power distribution management module. The third controller also contains a number of internal communication channels and external communication ports for signal communication.

The DPS diagnosis/prognosis module generates a set of DPS diagnosis/prognosis (DPS D/P) information signals. The DPS fault tolerance management module generates a set of system states assessment information signals and a set of system states management decision signals. The power distribution management module generates a set of power distribution management decision signals.

In this hierarchical controller, the DPS diagnosis/prognosis module contains a subsystem diagnostics auditing module, a DPS diagnostics module, a DPS prognostics module and an offline maintenance module. The DPS fault tolerance management module contains a health management module, a fault mitigation module, and a fault tolerance module. The power distribution management module comprising an efficiency control module, a battery-charge balancing module, a thermal balancing module and a power management module The DPS diagnosis/prognosis module is electrically connected with the second controller. It transmits the DPS diagnosis/prognosis information to the second controller via electric communication over an external communication port located at the third controller. The DPS diagnosis/prognosis module is also electrically connected with the DPS fault tolerance management module, it transmits the DPS diagnosis/prognosis information to the DPS fault tolerance management module over an internal communication channel located at the third controller. The DPS diagnosis/prognosis module receives the system states assessment information signals from the DPS fault tolerance module over an internal communication channel.

The DPS fault tolerance management module is electrically connected with the DPS diagnosis/prognosis module. The DPS fault tolerance management module also receives the DPS diagnosis/prognosis information signals from the DPS diagnosis/prognosis module over an internal communication channel. It transmits the system states assessment information signals to the DPS diagnosis/prognosis module over an internal communication channel.

The DPS fault tolerance management module is electrically connected with the power distribution management module. The DPS fault tolerance management module receives the power distribution management decision signals from the power distribution management module. It transmits the system states management decision signals to the power distribution management module over an internal communication channel located at the third controller.

The power distribution management module is electrically connected with the DPS fault tolerance module. The power distribution management module transmits the power distribution management decision signals to the DPS fault tolerance module. The power distribution management module also receives the system states management decision signals from the DPS fault tolerance module over an internal communication channel inside the third controller.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 9 shows an operation diagram of a vehicle control system with yet another different embodiment of a hierarchical control structure according to the present invention.

Figure 1:
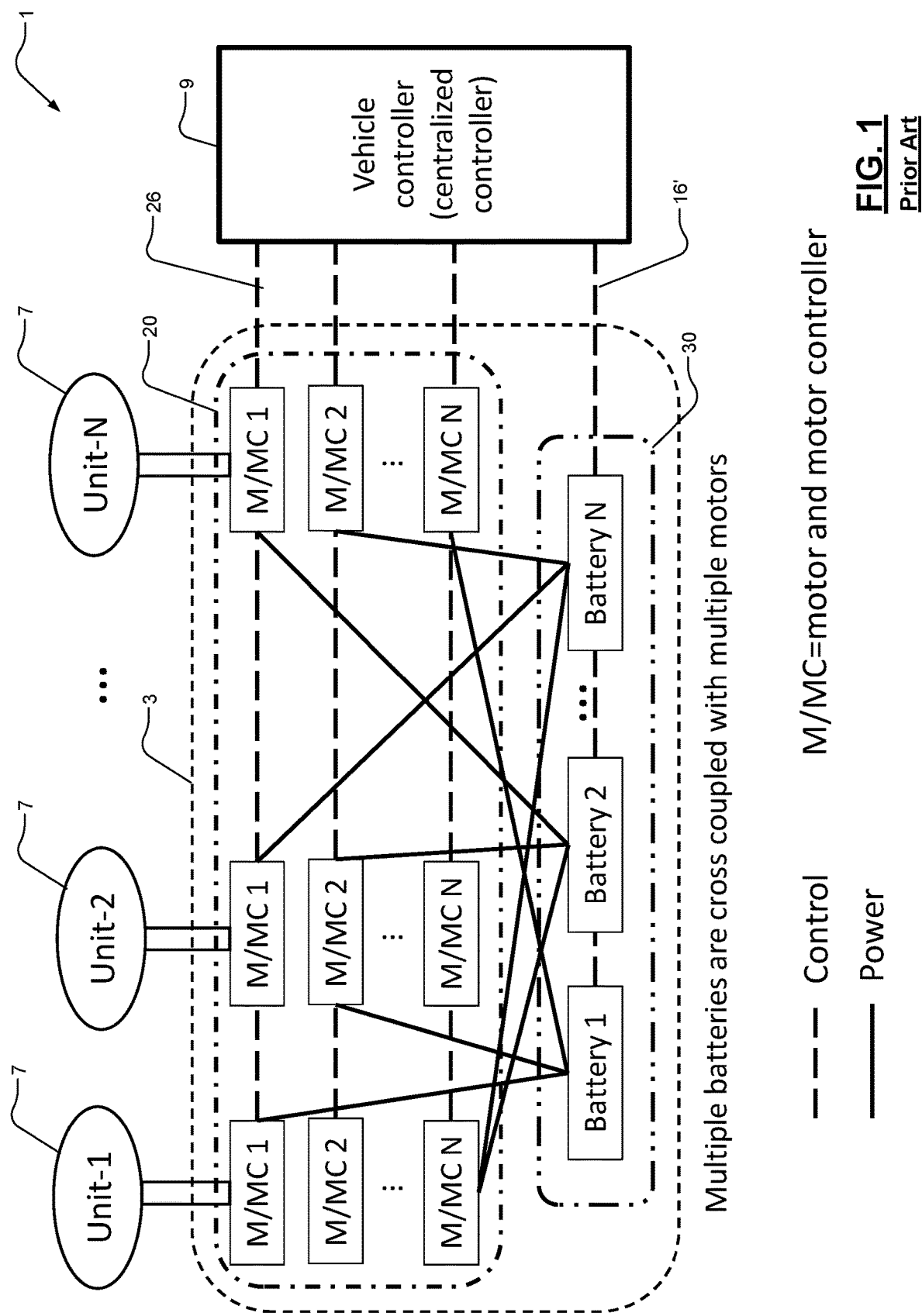
FIG. 1 shows a plan diagram of a prior art vehicle distributed power system.

The reference numbers in the Figures are listed below:

1 - Vehicle distributed power system (Prior Art)
2 - Vehicle distributed propulsion system
3 - Distributed Power System
4 - Vehicle command signals
5 - Measured shaft speed and torque
6 - Vehicle system
7 - Vehicle propulsion elements
8 - Vehicle and environmental information
9 - Centralized vehicle controller
9-1 - Vehicle controller with fault tolerance
10 - Distributed Power Control Unit
10-1 - Distributed Power Control Unit with integrated vehicle controller
10-2 - Distributed Power Control Unit with integrated BMS
11 - Auxiliary electrical load
12 - Other vehicle actuators
13 - Vehicle sensor cluster
14 - Vehicle on-board dynamic sensors
15 - Vehicle command generator
16 - Battery control command signal
17 - Charging control command signals
18 - DPS D/P information
19 - Clutch control command signals
20 - Motor system
21 - Motor/Clutch set
22 - Drive set/motor
23 - Clutches
24 - Drive-set switches/relays
25 - Motor control/diagnostics module
26 - Axle speed command signals
27 - Motor speed command signals
28 - Measured motor speed
29 - Drive-set/motor control signals
30 - Battery system
31 - Battery pack
32 - BMS/diagnostics module
33 - Energy source generator
34 - BMS module
35 - Battery diagnostics module
36 - Battery pack switches/relays
37 - Electric power
38 - Vehicle dynamics signal
39 - Other vehicle commands
40 - Final drive shaft/Axle
100 - DPS diagnosis/prognosis module
110 - Subsystem diagnostics auditing module
120 - DPS diagnostics module
130 - DPS prognostics module
140 - Offline maintenance module
200 - DPS fault tolerance management module
210 - Health management module
220 - Fault mitigation module
230 - Fault tolerance module
300 - Power distribution management module
310 - Efficiency control module
320 - Battery charge balancing module
330 - Thermal balancing module
340 - Power management module
410 - Axle speed command signal transmission
420 - Battery control command signal transmission
430 - Battery diagnosis code/measurements signals transmission
440 - DPS D/P information signals external transmission
450 - Motor control command signal transmission
460 - Clutch control command signal transmission
470 - Motor diagnosis code/measurements signal transmission
480 - Charging control signal transmission
510 - DPS D/P information signals internal communication
520 - System states assessment information signals communication
530 - System states management decision signals communication
540 - Power distribution management decision signals communication
601 - Health state assessment signal
602 - Fault mitigation assessment signal
603 - Fault tolerance assessment signal
701 - Audited diagnostics information signal
702 - DPS diagnostics information signal
703 - DPS prognostics information signal
704 - Offline check/self-excited diagnostics information signal 705 - Offline check/self-excited prognostics information signal
706 - Efficiency controls decisions signal
707 - Charge balancing decisions signal
708 - Thermal balancing decisions signal
709 - Power management decisions signal
802 - Health management decisions signal
803 - Fault mitigation decisions signal
804 - Fault tolerance decisions signal
901 - Battery diagnostics code/measurement signal
903 - Battery diagnostics code
910 - Battery measurement signal
912 - Battery pack control signal
920 - Motor diagnostics code
951 - Motor diagnostics code/measurement signal
Ⓐ Ⓑ Ⓒ Ⓓ Ⓔ Ⓕ Ⓖ Ⓗ - Various communication ports

DETAILED DESCRIPTION

The following description is merely exemplary in nature and is in no way intended to limit the disclosure, its application, or uses. For purposes of clarity, the same reference numbers with or without a single or multiple prime symbols appended thereto will be used in the drawings to identify similar elements. Likewise, the same reference numbers followed by a dash or hyphen and another number will be used in the drawings to identify similar elements with additional disclosed or non-disclosed relevant or non-relevant functions. It should also be understood that steps within a method may be executed in different order without altering the principles of the present disclosure unless otherwise specified.

As used herein, the term module may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality. The term electrical communication may mean signal transmission and receiving via electrical wiring means, or via electronic means. Further, the term vehicle used herein may refer to a ground wheeled or tracked vehicle, aircraft such as fixed wing electric aircraft, electric vertical take-off and landing aircraft, marine ship, or locomotive. The weight and size of the vehicle is not limited for all these applications. Accordingly, the controller employed for operation of the vehicle may be referred to as vehicle controller, automotive controller or flight controller, interchangeably from time to time.

In this disclosure, a novel control architecture for the distributed power system (DPS) is described. The control architecture disclosed herein shows an additional layer of control architecture to the state-of-the-art control architecture, therefore constituting two layers of control functions of a distributed propulsion system (DPS).

Referring now to FIG. 1, a prior-art vehicle distributed power system is shown. The state-of-the-arts vehicle distributed power system may include N units of multiple propulsion elements (7) driven by a Distributed Power System (3) to propel the vehicle, wherein N is an integer greater than one. These propelling elements operate in collaboration with each other under the control of a centralized vehicle controller (9) to provide the required vehicle propulsion to move the vehicle according to pre-determined operation and performance objectives. The vehicle propulsion may be force or torque for propelling the vehicle via the propelling elements. The These propelling elements may be road wheels of a ground vehicle, propellers of a boat or airplane, or rail wheels of a locomotive, or any means of propulsion element to propel a transportation machinery.

The Distributed Power System (3) may include a motor system (20) with multiple motors to provide required vehicle propulsion, in terms of force or torque, to the vehicle via mechanical interconnection between the vehicle propulsion elements (7) and the motor. Each of the N units of vehicle propulsion elements (7) is driven by one single motor alone or multiple motors jointly, and each motor is operated by a corresponding motor controller forming a M/MC set as illustrated in the diagram. There may be N units of M/MC sets in the motor system (20), where each set receives axle propelling command signals (26) from the centralized vehicle controller (9). The axle propelling command signal may be axle speed or torque command, or a combination thereof.

The Distributed Power System (3) may include a battery system (30) with N units of batteries providing electric power to the motors in the motor system (20) via electrical connection between the battery and the M/MC set. Each of the batteries may provide electric power to multiple units of the M/MC set, and each of the motors may receive electric power from multiple units of the batteries. Each of the batteries receives battery control command signal (16) from the centralized vehicle controller (9).

Figure 2:
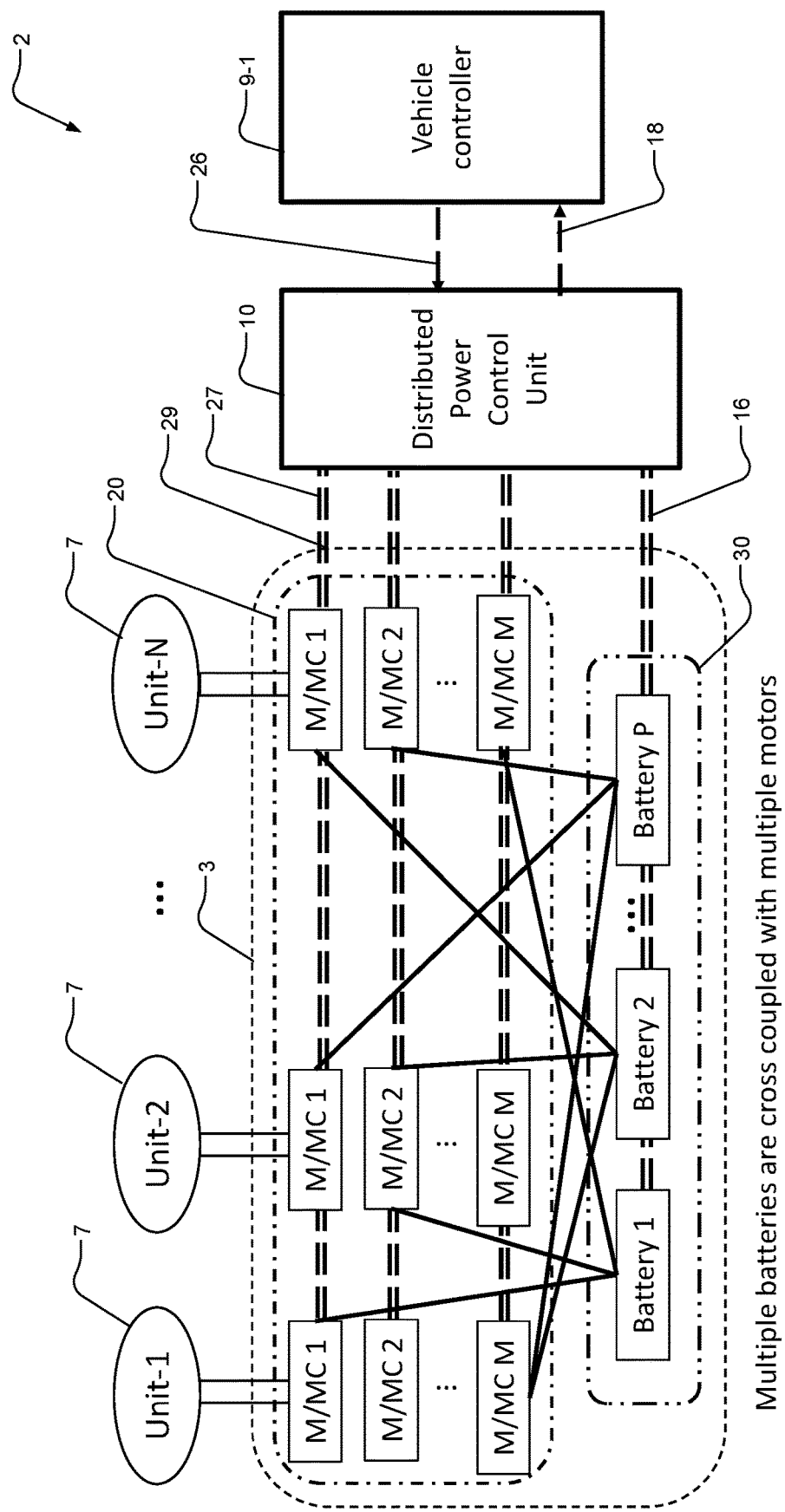
FIG. 2 shows a plan diagram of the vehicle distributed propulsion system according to the present invention.

Referring now to FIG. 2, a vehicle distributed propulsion system according to the present invention is shown. The vehicle distributed propulsion system may include N units of multiple propulsion elements (7) driven by a Distributed Power System (3) to propel the vehicle, wherein N is an integer greater than one. These propelling elements operate in collaboration with each other under the control of a vehicle controller with fault tolerance (9-1) through a distributed power control unit (10) to provide the required vehicle propulsion, in terms of force or torque, to move the vehicle according to pre-determined operation and performance objectives, and also to provide a capability of system fault tolerance for system's healthy operation should system fault be present in the distributed power operation. These propelling elements may be road wheels of a ground vehicle, propellers of a boat or airplane, or rail wheels of a locomotive, or any means of propulsion element to propel a transportation machinery.

The distributed Power Control Unit (10) is configured to be in electric communication with the vehicle controller with fault tolerance (9-1). The distributed Power Control Unit (10) receives axle propelling command signals (26), which may be a speed command, a torque command, or a combination thereof, from the vehicle controller with fault tolerance (9-1) and transmits distributed power system diagnosis/prognosis (DPS D/P) signals (18) and others such as available power constraints or limitations in each drive unit to the vehicle controller with fault tolerance (9-1).

The Distributed Power System (3) may include a motor system (20) with multiple motors to provide required propulsion force or torque to the vehicle via mechanical interconnection between the vehicle propulsion elements (7) and the motor. Each of the N units of vehicle propulsion elements (7) is driven by one single motor alone or multiple motors jointly, and each motor is operated by a corresponding motor controller forming a M/MC set as illustrated in the diagram.

The number of motors in the motor system (20), M, where M is an integer, may be equal to, or greater than the number of the vehicle propulsion elements (7), N. Each of the M/MC sets are in electrical communication with the vehicle controller with fault tolerance (9-1) and receives motor speed and/or torque command signals (27) and drive-set/motor control signals (29) from the distributed Power Control Unit (10).

The Distributed Power System (3) may include a battery system (30) with P units of batteries providing electric power to the motors in the motor system (20) via electrical connection between the battery and the M/MC set. The number of batteries in the battery system (30), P, may be less than, or equal to, or greater than the number of the motors, M. Each of the batteries may provide electric power to multiple units of the M/MC set, and each of the motors may receive electric power from multiple units of the batteries. Each of the batteries receives battery control command signal (16) from the distributed Power Control Unit (10).

Figure 3:
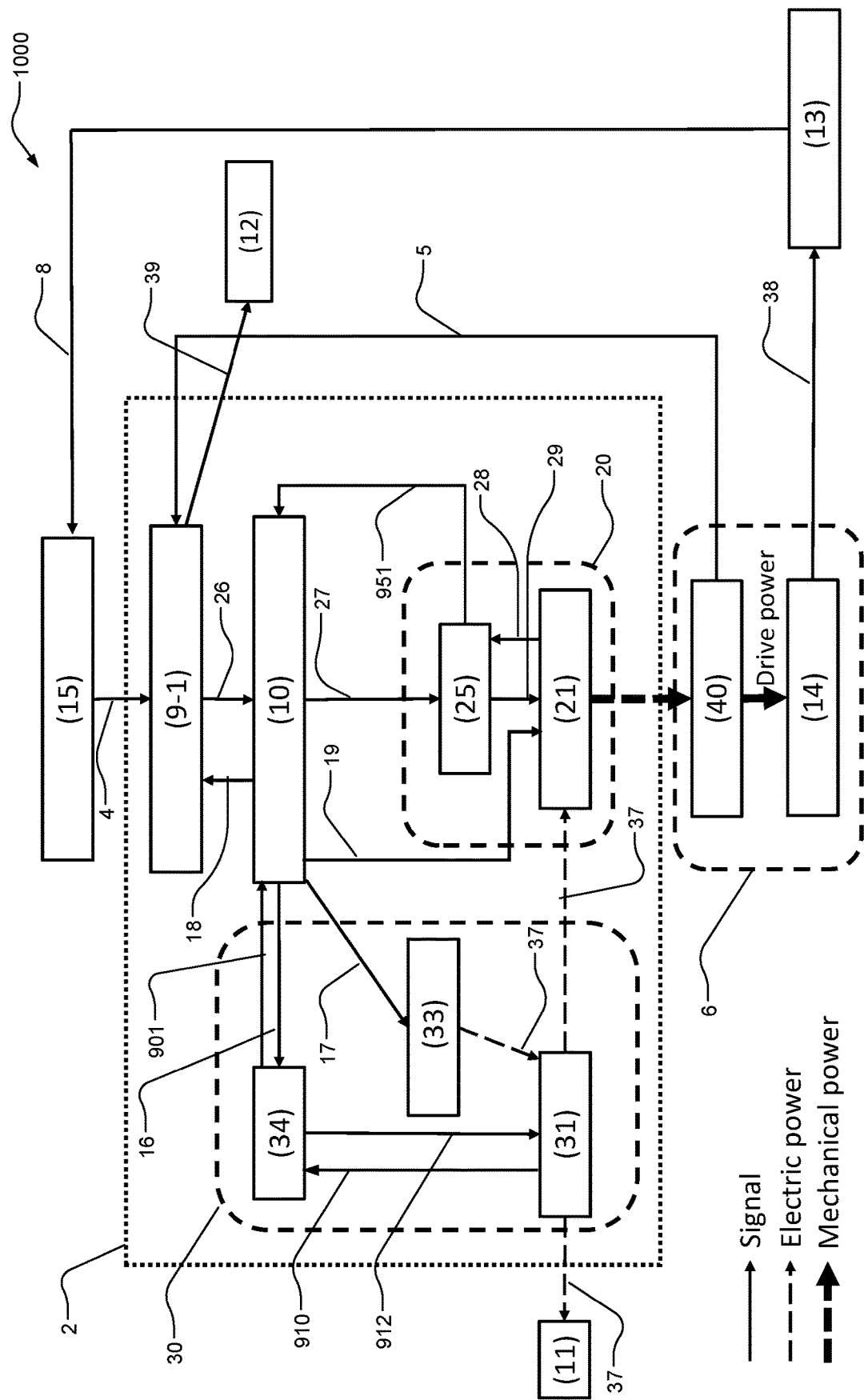
FIG. 3 illustrates an operation diagram of a vehicle control system with a hierarchical control structure according to the present invention.

Referring now to FIG. 3, an operation diagram of a vehicle control system with a hierarchical control structure (1000) is shown. The vehicle control system (1000) may include a first-level controller vehicle command generator (15) that generates vehicle command signals (4) for the vehicle control. The vehicle command generator (15) is in electrical communication with the vehicle distributed propulsion system (2), and vehicle distributed propulsion system (2) receives the vehicle command signals (4) from the vehicle command generator (15).

The vehicle distributed propulsion system (2) may also include a second-level controller vehicle controller with fault tolerance (9-1) that receives vehicle command signals (4) from the first-level controller vehicle command generator (15) and generates axle propelling command signals (26) for motor axle speed or torque control to operate the desired vehicle motion control. The axle propelling command signal may be axle speed or torque command, or a combination thereof.

The operation of the second-level controller vehicle controller with fault tolerance (9-1) is subject to that of the higher-hierarchy controller, the first-level controller vehicle command generator (15).

The vehicle distributed propulsion system (2) may include a motor system (20). The vehicle distributed propulsion system (2) may further include a third-level controller distributed Power Control Unit (10) that receives axle propelling command signals (26), in terms of axle speed and torque, from the vehicle controller with fault tolerance (9-1) and generates motor speed and/or torque command signals (27) for the motor system (20). The operation of the third-level controller distributed Power Control Unit (10) is subject to that of its higher-hierarchy controller, the second-level controller vehicle controller with fault tolerance (9-1). The distributed Power Control Unit (10) is in electrical communication with vehicle controller with fault tolerance (9-1), and the distributed Power Control Unit (10) generates DPS D/P information (18) and others such as available power or torque constraints or limitations in each drive unit to be sent to and received by vehicle controller with fault tolerance (9-1).

The motor system (20) may include a motor control/diagnostics module (25) and a motor/clutch set (21). The distributed Power Control Unit (10) is in electrical communication with motor control/diagnostics module (25) of the motor system (20). The motor speed and/or torque command signals (27) generated by distributed Power Control Unit (10) is received by motor control/diagnostics module (25). The motor control/diagnostics module (25) may also generate motor diagnostics code/measurement signal (951) to be received by distributed Power Control Unit (10).

The motor/clutch set (21) is in electrical communication with motor control/diagnostics module (25) and distributed Power Control Unit (10). The motor/clutch set (21) receives the drive-set/motor control signals (29) from motor control/diagnostics module (25) and generates motor measurement signal (28) to be received by motor control/diagnostics module (25). The motor control/diagnostics module (25) also receives clutch control command (19) generated by distributed Power Control Unit (10).

The vehicle distributed propulsion system (2) may include a battery system (30). The battery system (30) may include a battery pack (31), an energy source generator (33) and a BMS/diagnostics module (34). The BMS/diagnostics module (34) is in electrical communication with the distributed Power Control Unit (10) and generates a battery diagnostics code/measurement signal (901) to be received by the distributed Power Control Unit (10), and also receives a battery control command signal (16) generated by the distributed Power Control Unit (10).

The battery pack (31) is in electrical communication with the BMS/diagnostics module (34). The battery pack (31) generates battery measurement signal (910) to be received by the BMS/diagnostics module (34) and receives a battery pack control signal (912) generated by the BMS/diagnostics module (34). The battery pack (31) is electrically connected with the motor/clutch set (21) and provides electric power to the motor/clutch set (21) via the electrical connection. The battery pack (31) is also electrically connected with other auxiliary electrical loads (11) and provides electric power to the auxiliary electrical loads (11) via the electric connection.

The energy source generator (33) is in electrical communication with the distributed Power Control Unit (10) and receives charging control command signal (17) from the distributed Power Control Unit (10). The energy source generator (33) is also electrically connected with the battery pack (31) and provides electrical power to charge the battery pack (31) via the electrical connection.

The motor/clutch set (21) is mechanically connected with the vehicle system (6). The motor/clutch set (21) provides mechanical power to the final drive shaft/axle (40) of the vehicle system (6). The driving power provided by the motor/clutch set (21) propels the vehicle, and the various aspects of the resultant vehicle dynamic behavior are detected by vehicle on-board dynamic sensors (14). The vehicle on-board dynamic sensors (14) generate vehicle dynamics signal (38), and these signals, together with other signals generated by a vehicle sensor cluster (13) forms a set of vehicle and environmental information (8). The vehicle and environmental information (8) may be sent to and received by the vehicle command generator (15).

The final drive shaft/axle (40) may also generate signals of measured shaft speed and torque (5). These signals of measured shaft speed and torque (5) may be sent to and received by the vehicle controller with fault tolerance (9-1). The vehicle controller with fault tolerance (9-1) may further be in electrical communication with other vehicle actuators (12), and the vehicle controller with fault tolerance (9-1)

generates other vehicle commands (39) to be received by other vehicle actuators (12) for operation of other vehicle features and functions.

Figure 4:
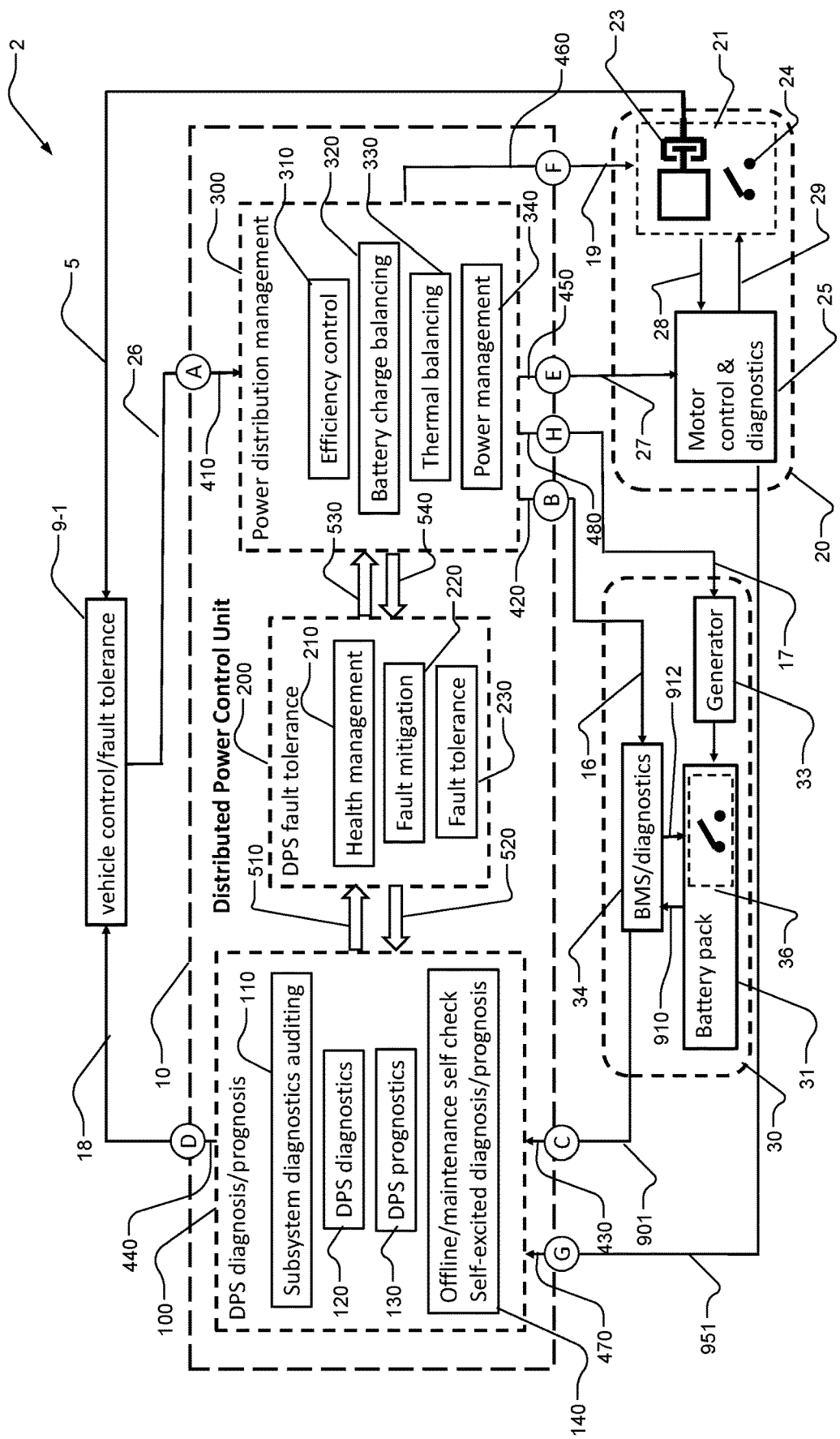
FIG. 4 shows a plan diagram of the vehicle distributed propulsion system with more details of the distributed power control unit according to the present invention.

Referring now to FIG. 4, a plan diagram of the vehicle distributed propulsion system (2) with more details of the distributed power control unit is shown. The vehicle distributed propulsion system (2) may include a vehicle controller with fault tolerance (9-1) and a distributed Power Control Unit (10) in electrical communication. The vehicle controller with fault tolerance (9-1) generates and sends axle propelling command signals (26), in terms of axle speed or torque, to distributed Power Control Unit (10) via a communication port (A) at the distributed Power Control Unit (10), and the distributed Power Control Unit (10) generates and sends DPS D/P information (18) and other information including available power or torque constraints or limitations in each drive unit to vehicle controller with fault tolerance (9-1) via a communication port (D) from the distributed Power Control Unit (10).

The distributed Power Control Unit (10) may include a DPS diagnosis/prognosis module (100), a DPS fault tolerance management module (200) and a power distribution management module (300). The DPS diagnosis/prognosis module (100) is in electrical communication with DPS fault tolerance management module (200) via DPS D/P information signals internal communication (510) and system states assessment information signals communication (520). The DPS fault tolerance management module (200) is also in electrical communication with power distribution management module (300) via system states management decision signals communication (530) and power distribution management decision signals communication (540).

The DPS diagnosis/prognosis module (100) may further be configured to be in electrical communication with a battery system (30) via a communication port (C) where the distributed Power Control Unit (10) receives the battery diagnostics code/measurement signal (901) from the battery system (30). The DPS diagnosis/prognosis module (100) may also be configured to be in electrical communication with a motor system (20) via a communication port (G) where the distributed Power Control Unit (10) receives the motor diagnostics code/measurement signal (951) from the motor system (20).

The power distribution management module (300) may be configured to be in electrical communication with the battery system (30) via communication ports (B) and (H) where the power distribution management module (300) generates battery control command signal (16) and sends to the battery system (30) via the communication port (B); and the power distribution management module (300) generates charging control command signal (17) and sends to the battery system (30) via the communication port (H).

The power distribution management module (300) may further be configured to be in electrical communication with the motor system (20) via communication ports (E) and (F) where the power distribution management module (300) generates motor speed and/or torque or power command signals (27) and sends to the motor system (20) via the communication port (E); and the power distribution management module (300) generates clutch control command (19) and sends to the motor system (20) via the communication port (F).

The DPS diagnosis/prognosis module (100) may include a subsystem diagnostics auditing module (110), a DPS diagnostics module (120), a DPS prognostics module (130) and an offline maintenance module (140). The DPS fault tolerance management module (200) may include a health management module (210), a fault mitigation module (220) and a fault tolerance module (230). The power distribution management module (300) may include an efficiency control module (310), a battery charge balancing module (320), a thermal balancing module (330) and a power management module (340).

The vehicle distributed propulsion system (2) may include a battery system (30) and a motor system (20). The battery system (30) may include a battery pack (31), a BMS/diagnostics module (34) and an energy source generator (33). The BMS/diagnostics module (34) may include a BMS module (32) and a battery diagnostics module (35). The battery system (30) may also include battery pack switches/relays (36) for operation of the battery pack (31).

The motor system (20) may include a motor control/diagnostics module (25) and a motor/clutch set (21). The motor/clutch set (21) may also include clutches (23) and drive-set switches/relays (24) for the operation of the motors.

The DPS diagnosis/prognosis module (100) enhances subsystem level diagnosis in the subsystem diagnostics auditing module (110), conducts propulsion system level diagnosis in (120) and system and subsystem level prognosis in (130), and provides offline onboard D/P programs by injecting active excitations and over-the-air D/P programs via historical data analysis over numerous vehicles in remote workstations in (140). The subsystem diagnostics auditing module (110) uses the inherent redundancy in distributed electrical propulsion systems to cross-check subsystems and to compare local measurements and diagnostics from correlated subsystems. It also compares equivalent subsystems to enhance the subsystem diagnosis. The DPS controller does not need to handle local signal measurement and processing. It has more computing power and memory than local subsystem controllers such as battery controllers and motor controllers due to the cost of realization of distributed electrical propulsion systems. The diagnostics module (120) and prognostics module (130) utilize the computing power of DPS controller to conduct advanced algorithms for propulsion system level D/P. It should be noted that local BMS algorithms or software can be incorporated into the diagnostics module (120) and prognostics module (130) so that local battery controllers can be further simplified for cost reduction. The offline maintenance module (140) conducts auto self-check processes offline through external devices and/or self-excited programs. It also uploads D/P information and engineering data processed/stored in DPS to remote workstations for big data analysis (e.g., vehicle life cycle data, fleet data etc.) in back office. Meanwhile it downloads information from remote workstations and updates control parameters and calibration values for the electrical propulsion systems. The D/P information acquired from the DPS D/P module (100) is sent to the DPS fault tolerance management module (200), while (100) also receives the decisions made by (200) to update its evaluation and estimation algorithms. The DPS fault tolerance management module (200) conducts three-level fault prevention and compensation schemes based on the D/P information provided by the DPS D/P module (100) to prolong the life of DEPS, to improve robustness to operations and environment, and to increase reliability and safety of vehicles. The health management module (210) conducts the first level fault prevention schemes by adjusting the workload on redundant subsystems to maintain a consistent health level with the DEPS. At the second level, the fault mitigation module (220) conducts aggressive strategies to shift load from failing components to other healthy ones so as to minimize the effect of potential failures. The fault tolerance module (230), as the third level, deals with significant faults and failures in DEPS by shutting down the failed components or subsystems and redistributing the workload among those working components or subsystems so as to maintain the propulsion power required by the vehicle level controller. The decisions made by the DPS fault tolerance management module (200) are sent to the power distribution management module (300), while (300) instructs (200) the optimized power distribution for (200) to adjust its strategies to deal with potential failures and existing faults. The power distribution management module (300) optimizes the power distribution among electrical propulsion subsystems to achieve goals such as the highest efficiency, robustness, and reliability, and the longest life of components and systems. The efficiency control module (310) guarantees the highest combined efficiency of collaborative subsystems. The battery charge balancing module (320) maintains a balance of charge among all the batteries to avoid the presence of significant weakness in power sources. The thermal balancing module (330) manages the thermal stress of each propulsion subsystem to ensure that the components and subsystems such as batteries and motors operate below damaging temperatures, so as to avoid fast deterioration and potential failures. In case that desired temperatures cannot be maintained due to critical conditions or safety concerns, the balance of thermal stress among subsystems is to be optimized to prevent a sudden failure. The power management module (340) combines the information and requirements from (210), (220), (230), (310), (320), and (330), and carries out a global optimization scheme to determine the power distribution over electrical propulsion subsystems and components.

The battery system (30) consists of a number of battery packs with same or different electrical and mechanical configurations as the power sources of distributed electrical power systems. Each battery pack has its local controller that measures and processes voltage, current, and temperature signals, and controls local relays and/or contactors to switch on or off the battery. A local BMS can be implemented into the local controller to conduct local diagnosis and management of the battery. The local battery controller communicates with the DPS (10) via lower level networks, such as redundant lower-level CAN networks, sending measurements and local diagnostics to the DPS (10) and at the same time receiving commands from the DPS (10) to control local relays and/or contactors. With the DPS (10) following a distributed architecture in this invention, each local BMS can be incorporated into the DPS (10) and deployed into several redundant DPS controllers. The inclusion of BMS into the distributed DPS increases redundancy, improves reliability, and reduces cost. It is noted that the distributed DPS in this invention introduces the flexibility of BMS implementation and enables the improvement and benefits of distributed BMS in an upper level controller. The battery system (30) may also include power generation subsystems to provide onboard charge from extra power sources such as gasoline, solar power, etc. The control of such power generators is carried out in the BMS as well. The motor system (20) consists of a set of electrical machines and their local controllers to realize the power output to the vehicle, such as driving the propellers of an aircraft or the wheels of a vehicle. The motor system (20) receives the commands from the DPS (10) via lower level networks such as redundant lower-level CAN networks, or high level networks such as redundant lower-level CAN networks. Meanwhile the motor system (20) measures voltage, current, and temperature signals and sends to the DPS (10) via the same lower level networks or high level networks. The motor system (20) can also include switches to electrically disconnect machines from power sources, and clutches to mechanically detach machines from shafts, in case of machine faults.

Figure 5:
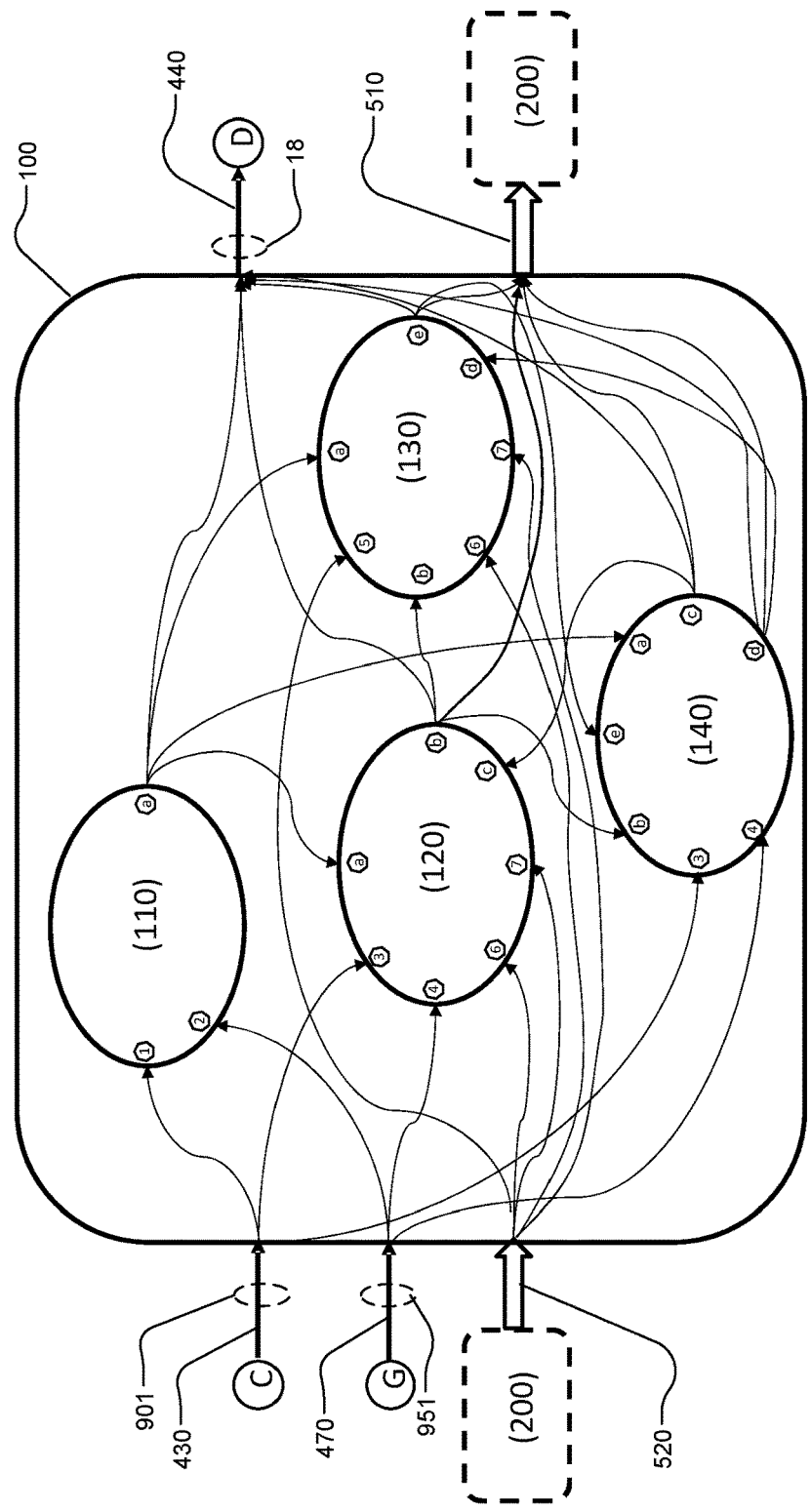
FIG. 5 illustrates a plan diagram of a DPS diagnosis/prognosis module according to the present invention.

Referring now to FIG. 5, a plan diagram of the DPS diagnosis/prognosis module (100) is shown. The DPS diagnosis/prognosis module (100) is electrically connected to a battery diagnosis code/measurements signals transmission (430) which is connected to the communication port (C) at the distributed Power Control Unit (10). The DPS diagnosis/prognosis module (100) receives battery diagnostics code/measurement signal (901) from the battery diagnosis code/measurements signals transmission (430). The DPS diagnosis/prognosis module (100) is also electrically connected to a motor diagnosis code/measurements signal transmission (470) which is connected to the communication port (G) at the distributed Power Control Unit (10). The DPS diagnosis/prognosis module (100) receives motor diagnostics code/measurement signal (951) from the motor diagnosis code/measurements signal transmission (470). The DPS diagnosis/prognosis module (100) is electrically connected to a system states assessment information signals communication (520) for receiving data, which is in electrical communication with the DPS fault tolerance management module (200).

The DPS diagnosis/prognosis module (100) is electrically connected to a DPS D/P information signals external transmission (440) which is connected to the communication port (D) at the distributed Power Control Unit (10). The DPS diagnosis/prognosis module (100) transmits DPS D/P information (18) to the DPS D/P information signals external transmission (440). The DPS diagnosis/prognosis module (100) is also electrically connected to a DPS D/P information signals internal communication (510) for data transmission, which is in electrical communication with the DPS fault tolerance management module (200).

The battery diagnostics code/measurement signal (901) may include battery diagnostics code (903) and battery measurement signal (910). The battery diagnosis code/measurements signals transmission (430) is in electrical communication with the subsystem diagnostics auditing module (110), DPS diagnostics module (120) and offline maintenance module (140). The battery diagnostics code (903) is transmitted to the subsystem diagnostics auditing module (110), and the battery measurement signal (910) is transmitted to the DPS diagnostics module (120) and offline maintenance module (140).

The motor diagnostics code/measurement signal (951) may include motor diagnostics code (920) and motor speed measurement (28). The motor diagnosis code/measurements signal transmission (470) is in electrical communication with the subsystem diagnostics auditing module (110), DPS diagnostics module (120) and offline maintenance module (140). The motor diagnostics code (920) is transmitted to the subsystem diagnostics auditing module (110), and the motor speed measurement (28) is transmitted to the DPS diagnostics module (120) and offline maintenance module (140).

The system states assessment information signals communication (520) carries signals of health management decisions signal (802), Fault mitigation decisions signal (803) and fault tolerance decisions signal (804). The system states assessment information signals communication (520) is in electrical communication with the DPS diagnostics module (120) and DPS prognostics module (130). The system states assessment information signals communication (520) transmits the health management decisions signal (802) to the DPS prognostics module (130), transmits the Fault mitigation decisions signal (803) and fault tolerance decisions signal (804) to both DPS diagnostics module (120) and DPS prognostics module (130).

The subsystem diagnostics auditing module (110) is in electrical communication with the DPS diagnostics module (120), DPS prognostics module (130) and offline maintenance module (140). The subsystem diagnostics auditing module (110) is also in electric communication with the DPS D/P information signals external transmission (440). The subsystem diagnostics auditing module (110) generates and transmits audited diagnostics information signal (701) to the DPS diagnostics module (120), DPS prognostics module (130), offline maintenance module (140) and DPS D/P information signals external transmission (440).

The DPS diagnostics module (120) is in electrical communication with the subsystem diagnostics auditing module (110), DPS prognostics module (130) and offline maintenance module (140). The DPS diagnostics module (120) is also in electrical communication with the DPS D/P information signals external transmission (440) and the DPS D/P information signals internal communication (510). The DPS diagnostics module (120) receives the audited diagnostics information signal (701) from the subsystem diagnostics auditing module (110). The DPS diagnostics module (120) also receives the offline check/self-excited diagnostics information signal (704) from the offline maintenance module (140). The DPS diagnostics module (120) generates and transmits the DPS diagnostics information signal (702) to the DPS prognostics module (130), offline maintenance module (140), DPS D/P information signals external transmission (440) and DPS D/P information signals internal communication (510).

The DPS prognostics module (130) is in electrical communication with the subsystem diagnostics auditing module (110), DPS diagnostics module (120) and offline maintenance module (140). The DPS prognostics module (130) is also in electrical communication with the DPS D/P information signals external transmission (440) and the DPS D/P information signals internal communication (510). The DPS prognostics module (130) receives the audited diagnostics information signal (701) from the subsystem diagnostics auditing module (110), receives the DPS diagnostics information signal (702) from the DPS diagnostics module (120), and receives the offline check/self-excited prognostics information signal (705) from the offline maintenance module (140). The DPS prognostics module (130) receives the Fault mitigation decisions signal (803) and fault tolerance decisions signal (804) from the system states assessment information signals communication (520). The DPS prognostics module (130) generates the DPS prognostics information signal (703) and transmits the DPS prognostics information signal (703) to the offline maintenance module (140), DPS D/P information signals internal communication (510) and the DPS D/P information signals external transmission (440).

The offline maintenance module (140) is in electrical communication with the subsystem diagnostics auditing module (110), DPS diagnostics module (120) and DPS prognostics module (130). The offline maintenance module (140) is also in electrical communication with the DPS D/P information signals external transmission (440) and the DPS D/P information signals internal communication (510). The offline maintenance module (140) receives the audited diagnostics information signal (701) from the subsystem diagnostics auditing module (110), the DPS diagnostics information signal (702) from the DPS diagnostics module (120) and DPS prognostics information signal (703) from the DPS prognostics module (130). The offline maintenance module (140) generates and transmits the offline check/self-excited diagnostics information signal (704) to the DPS diagnostics module (120), DPS D/P information signals external transmission (440) and DPS D/P information signals internal communication (510). The offline maintenance module (140) also generates and transmits the offline check/self-excited prognostics information signal (705) to the DPS prognostics module (130), DPS D/P information signals external transmission (440) and DPS D/P information signals internal communication (510).

Figure 6:
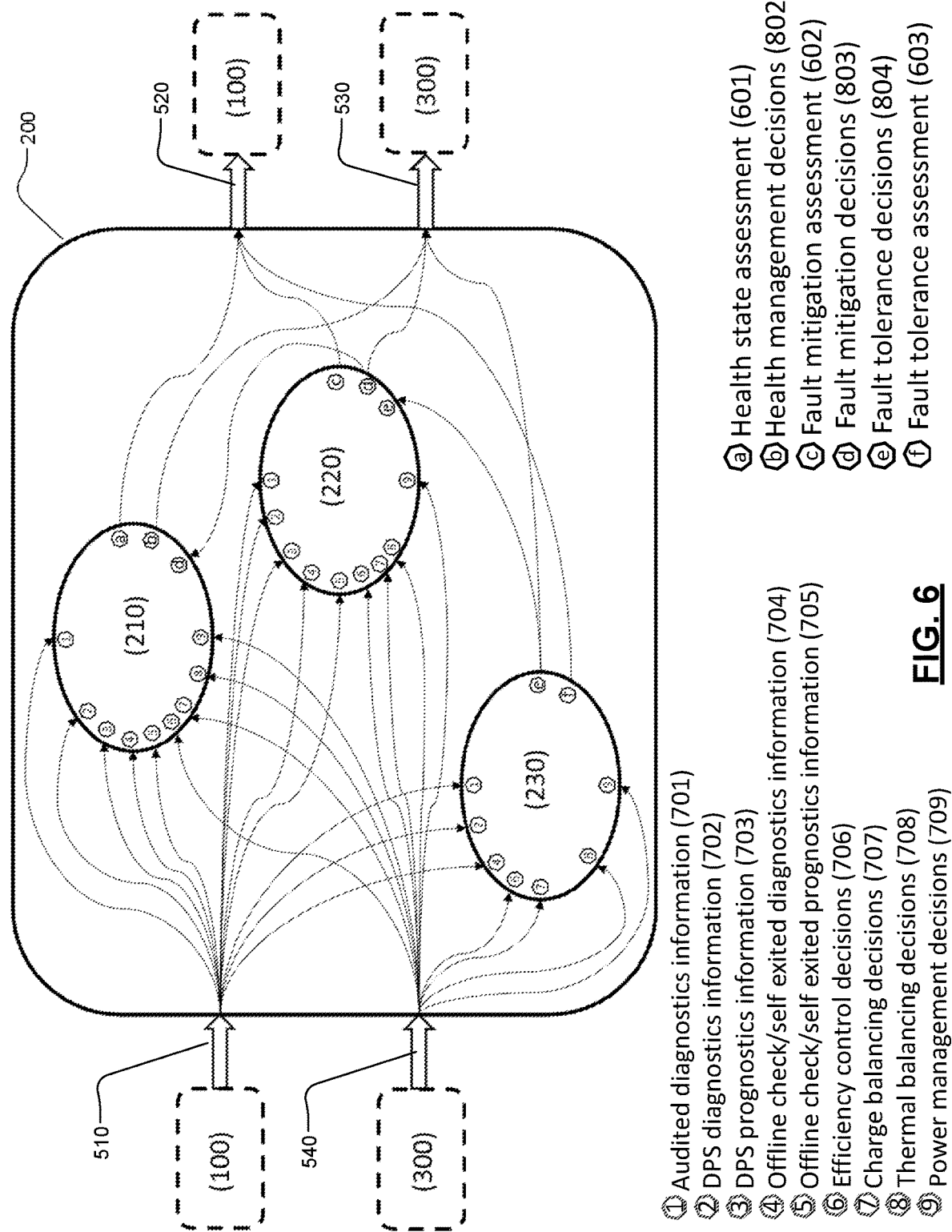
FIG. 6 illustrates a plan diagram of a DPS fault tolerance management module according to the present invention.

Referring now to FIG. 6, a plan diagram of the DPS fault tolerance management module (200) is shown. The DPS fault tolerance management module (200) is electrically connected with the DPS D/P information signals internal communication (510) and system states assessment information signals communication (520), which, in turn, are in electrical communication with the DPS diagnosis/prognosis module (100). The DPS fault tolerance management module (200) is electrically connected with the system states management decision signals communication (530) and power distribution management decision signals communication (540), which, in turn, are in electric communication with the power distribution management module (300). The DPS D/P information signals internal communication (510) is in electrical communication with the health management module (210), fault mitigation module (220) and fault tolerance module (230), and signals carried by the DPS D/P information signals internal communication (510) are transmitted to the health management module (210), fault mitigation module (220) and fault tolerance module (230). The power distribution management decision signals communication (540) is also in electrical communication with the health management module (210), fault mitigation module (220) and fault tolerance module (230), and signals carried by the power distribution management decision signals communication (540) are also transmitted to the health management module (210), fault mitigation module (220) and fault tolerance module (230).

The signals carried by the DPS D/P information signals internal communication (510) may include audited diagnostics information signal (701), DPS diagnostics information signal (702), DPS prognostics information signal (703), offline check/self-excited diagnostics information signal (704) and offline check/self-excited prognostics information signal (705). The DPS D/P information signals internal communication (510) transmits the audited diagnostics information signal (701), DPS diagnostics information signal (702), DPS prognostics information signal (703), offline check/self-excited diagnostics information signal (704) and offline check/self-excited prognostics information signal (705) to both health management module (210) and fault mitigation module (220). The DPS D/P information signals internal communication (510) transmits the audited diagnostics information signal (701), DPS diagnostics information signal (702) and offline check/self-excited diagnostics information signal (704) to the fault tolerance module (230).

The signals carried by the power distribution management decision signals communication (540) may include efficiency controls decisions signal (706), charge balancing decisions signal (707), thermal balancing decisions signal (708) and power management decisions signal (709). The power distribution management decision signals communication (540) transmits the efficiency controls decisions signal (706), charge balancing decisions signal (707), thermal balancing decisions signal (708) and power management decisions signal (709) to the health management module (210), fault mitigation module (220) and fault tolerance module (230).

The health management module (210) is in electrical communication with the fault mitigation module (220), system states assessment information signals communication (520) and system states management decision signals communication (530). The fault mitigation module (220) is in electrical communication with the health management module (210), fault tolerance module (230), system states assessment information signals communication (520) and system states management decision signals communication (530). The fault tolerance module (230) is in electrical communication with the fault mitigation module (220), system states assessment information signals communication (520) and system states management decision signals communication (530).

The health management module (210) generates and transmits the health state assessment signal (601) to the system states assessment information signals communication (520) and generates and transmits the health management decisions signal (802) to the system states management decision signals communication (530). The health management module (210) received the Fault mitigation decisions signal (803) from the fault mitigation module (220).

The fault mitigation module (220) generates and transmits the fault mitigation assessment signal (602) to the system states assessment information signals communication (520). The fault mitigation module (220) also generates Fault mitigation decisions signal (803) and transmits the Fault mitigation decisions signal (803) to the health management module (210) and the system states management decision signals communication (530). The fault mitigation module (220) receives the fault tolerance decisions signal (804) from the fault tolerance module (230).

The fault tolerance module (230) generates fault tolerance decisions signal (804) and transmits the fault tolerance decisions signal (804) to the fault mitigation module (220) and the system states management decision signals communication (530). The fault tolerance module (230) also generates and transmits the fault tolerance assessment signal (603) to the system states assessment information signals communication (520).

Figure 7:
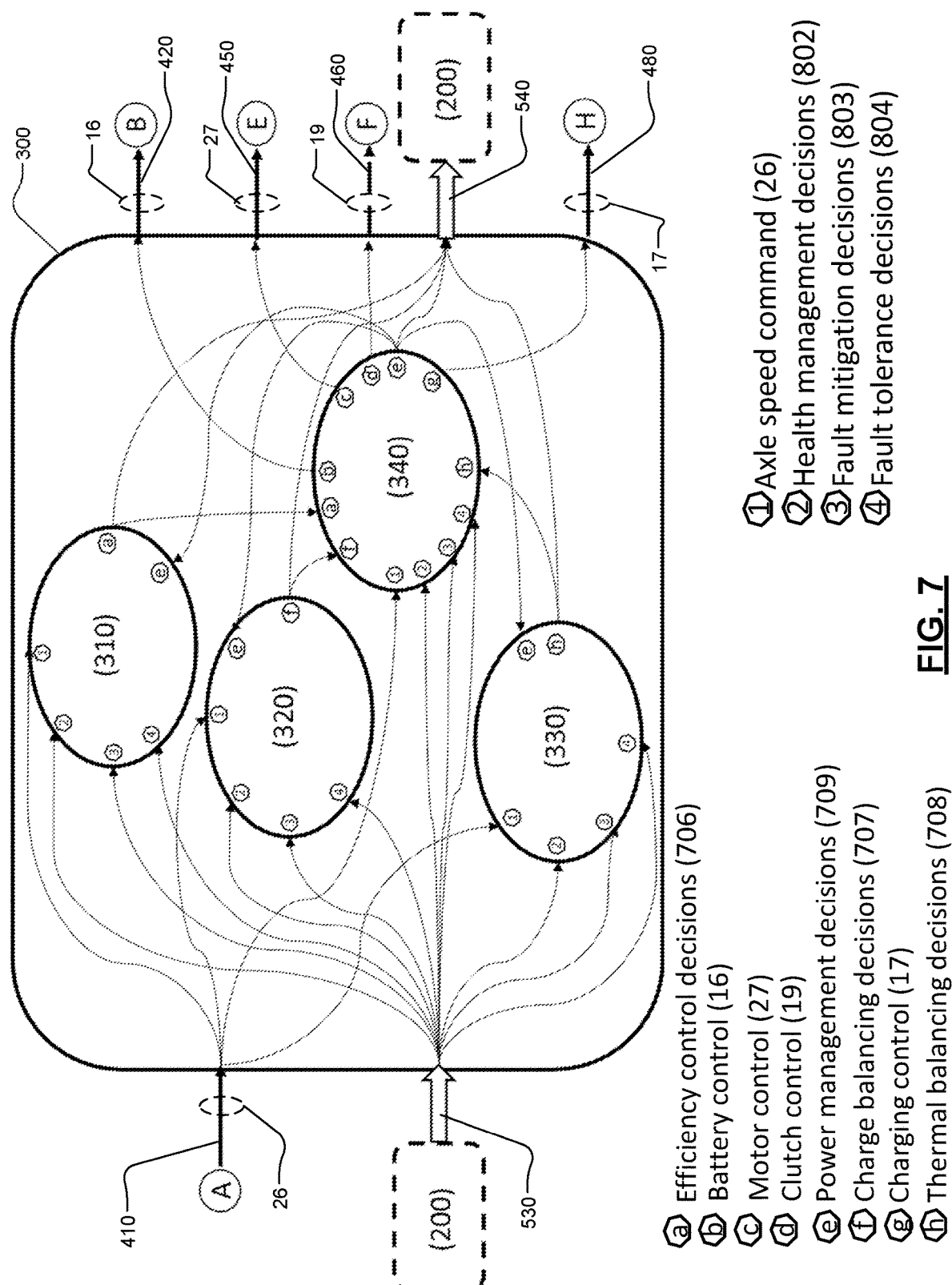
FIG. 7 illustrates a power distribution management module according to the present invention.

Referring now to FIG. 7, a plan diagram of the power distribution management module (300) is shown. The power distribution management module (300) is electrically connected to an axle propelling command signal transmission (410) which is connected to the communication port (A) at the distributed Power Control Unit (10). The power distribution management module (300) receives axle propelling command signals (26) from the axle propelling command signal transmission (410). The axle propelling command may be a speed command, a torque command, or a combination thereof. The power distribution management module (300) is electrically connected to a system states management decision signals communication (530) for receiving data, which is in electrical communication with the DPS fault tolerance management module (200).

The power distribution management module (300) is electrically connected to a battery control command signal transmission (420) which is connected to the communication port (B) at the distributed Power Control Unit (10). The power distribution management module (300) transmits battery control command signal (16) to the battery control command signal transmission (420). The power distribution management module (300) is electrically connected to a motor control command signal transmission (450) which is connected to the communication port (E) at the distributed Power Control Unit (10). The power distribution management module (300) transmits motor speed and/or torque command signals (27) to the motor control command signal transmission (450). The power distribution management module (300) is electrically connected to a clutch control command signal transmission (460) which is connected to the communication port (F) at the distributed Power Control Unit (10). The power distribution management module (300) transmits clutch control command (19) to the clutch control command signal transmission (460). The power distribution management module (300) is electrically connected to a charging control signal transmission (480) which is connected to the communication port (H) at the distributed Power Control Unit (10). The power distribution management module (300) transmits charging control command signal (17) to the charging control signal transmission (480). The power distribution management module (300) is also electrically connected to a power distribution management decision signals communication (540) for data transmission, which is in electrical communication with the DPS fault tolerance management module (200).

The axle propelling command signal transmission (410) carries axle propelling command signals (26) and transmits the axle propelling command signals (26), in terms of axle speed, torque, or a combination thereof, to the efficiency control module (310), battery charge balancing module (320), thermal balancing module (330) and power management module (340). The system states management decision signals communication (530) carries the signals of health management decisions signal (802), Fault mitigation decisions signal (803) and fault tolerance decisions signal (804), and the system states management decision signals communication (530) transmits these three signals to the efficiency control module (310), battery charge balancing module (320), thermal balancing module (330) and power management module (340).

The efficiency control module (310) is in electric communication with the power management module (340) and the power distribution management decision signals communication (540). The efficiency control module (310) receives a power management decisions signal (709) from the power management module (340). The efficiency control module (310) also generates a efficiency controls decisions signal (706) and transmits the efficiency controls decisions signal (706) to the power management module (340) and the power distribution management decision signals communication (540).

The battery charge balancing module (320) is in electric communication with the power management module (340) and the power distribution management decision signals communication (540). The battery charge balancing module (320) receives the power management decisions signal (709) from the power management module (340). The battery charge balancing module (320) also generates a charge balancing decisions signal (707) and transmits the charge balancing decisions signal (707) to the power management module (340) and the power distribution management decision signals communication (540).

The thermal balancing module (330) is in electric communication with the power management module (340) and the power distribution management decision signals communication (540). The power management module (340) receives the power management decisions signal (709) from the power management module (340). The thermal balancing module (330) also generates a thermal balancing decisions signal (708) and transmits the thermal balancing decisions signal (708) to the power management module (340) and the power distribution management decision signals communication (540).

The power management module (340) is in electrical communication with the efficiency control module (310), battery charge balancing module (320) and thermal balancing module (330). The power management module (340) is also in electric communication with the battery control command signal transmission (420), motor control command signal transmission (450), clutch control command signal transmission (460), charging control signal transmission (480) and power distribution management decision signals communication (540). The power management module (340) receives the efficiency controls decisions signal (706) from the efficiency control module (310), the charge balancing decisions signal (707) from the battery charge balancing module (320) and the thermal balancing decisions signal (708) from the thermal balancing module (330). The power management module (340) generates the power management decisions signal (709) and transmits the power management decisions signal (709) to the efficiency control module (310), battery charge balancing module (320) and thermal balancing module (330). The power management module (340) generates a battery control command signal (16) and transmits the battery control command signal (16) to the battery control command signal transmission (420). The power management module (340) generates a motor speed and/or torque command signals (27) and transmits the motor speed and/or torque command signals (27) to the motor control command signal transmission (450). The power management module (340) also generates a charging control command signal (17) and transmits the charging control command signal (17) to the charging control signal transmission (480).

Figure 8:
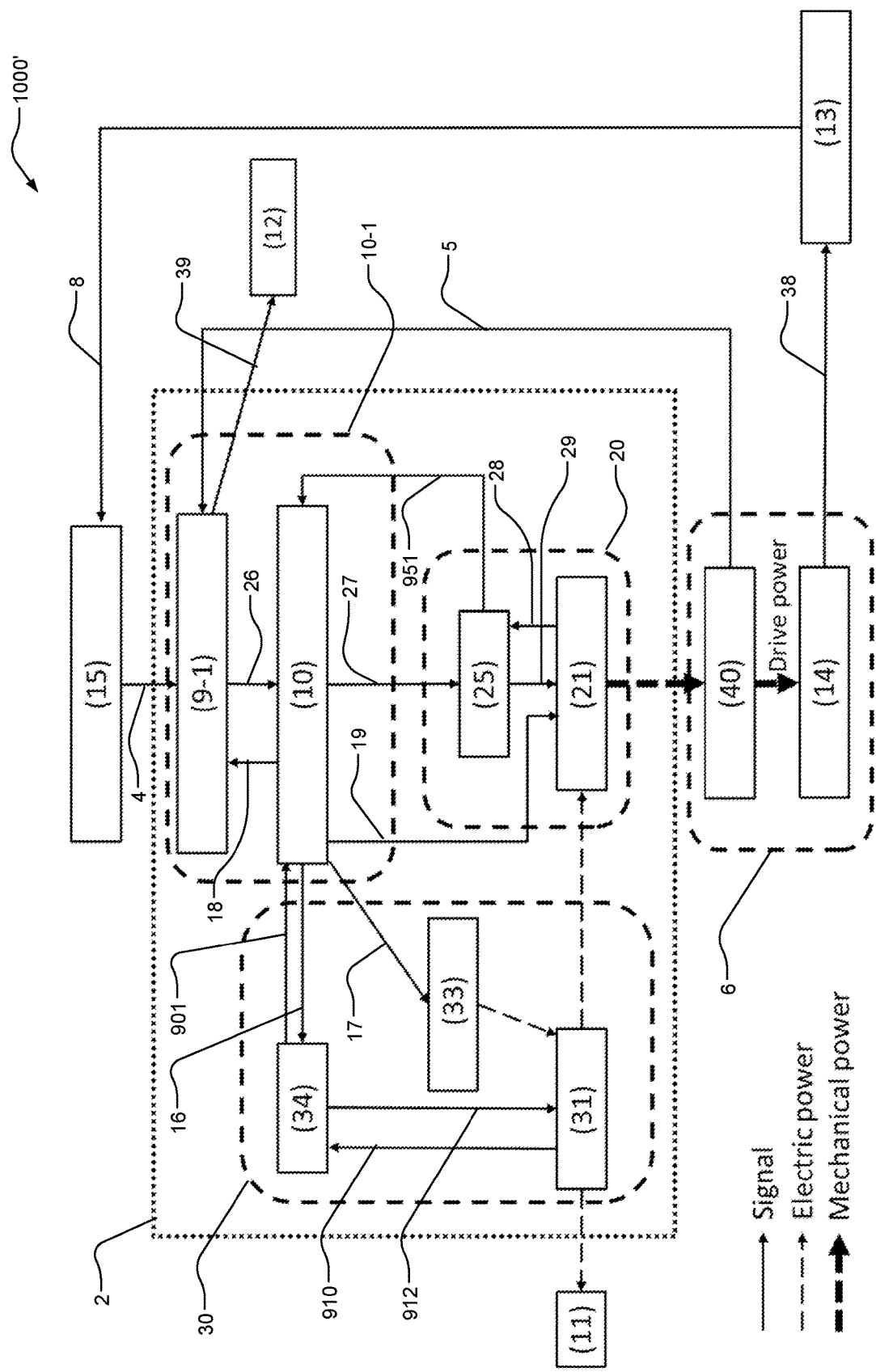
FIG. 8 shows an operation diagram of a vehicle control system with a different embodiment of a hierarchical control structure according to the present invention.

Referring now to FIG. 8, an operation diagram of a vehicle control system with a different embodiment of a hierarchical control structure (1000') is shown. In this configuration, while the functional modules of the distributed Power Control Unit (10) and vehicle controller with fault tolerance (9-1) are substantially the same as their corresponding counterparts in the vehicle control system (1000), the functional module of the distributed Power Control Unit (10) and the functional module of the vehicle controller with fault tolerance (9-1) in this vehicle control system (1000') are integrated in one single piece of hardware to form a Distributed Power Control Unit with integrated vehicle controller (10-1) as opposed to those in the vehicle control system (1000) where the functional module distributed Power Control Unit (10) and functional module vehicle controller with fault tolerance (9-1) may reside in separate pieces of hardware.

Referring now to FIG. 9, an operation diagram of a vehicle control system with yet another different embodiment of a hierarchical control structure (1000") is shown. In this configuration, while the functional modules of the distributed Power Control Unit (10) and the BMS/diagnostics module (34) are substantially the same as their corresponding counterparts in the vehicle control system (1000), the functional module of the distributed Power Control Unit (10) and the functional module of the BMS/diagnostics module (34) in this vehicle control system (1000") are integrated in one single piece of hardware to form a Distributed Power Control Unit with integrated BMS (10-2) as opposed to those in the vehicle control system (1000) where the functional module distributed Power Control Unit (10) and functional module BMS/diagnostics module (34) may reside in separate pieces of hardware.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A hierarchical vehicle control system for a vehicle equipped with a sensory system, said vehicle powered by a distributed propulsion system (DPS) comprising plurality of propelling axles wherein each of the axles is driven by an electric motor of a motor system comprising plurality of motors and powered by a battery system comprising plurality of battery packs, said sensory system generating vehicle and environmental signals, said hierarchical vehicle control system comprising a first controller that generates vehicle command signals, a second controller that generates axle command signals comprising one of an axle speed command, an axle torque command and a combination of axle speed and torque commands, for operation of the propelling axles, and a third controller that generates motor command signals comprising one of a motor speed command, a motor torque command and a combination of motor speed and torque commands, for operation of the electric motors, wherein:
the first controller is configured to receive the vehicle and environmental signals,
the second controller is configured to be in electric communication with the first controller, and configured to receive the vehicle command signals, wherein the axle command signals are generated based on the vehicle command signals,
the third controller is configured to be in electric communication with the second controller, configured to receive the axle command signals, wherein the motor command signals are generated based on the axle command signals;
said third controller further comprising:
a DPS diagnosis/prognosis module that generates a set of DPS diagnosis/prognosis (DPS D/P) information signals, a DPS fault tolerance management module that generates a set of system states assessment information signals and a set of system states management decision signals, a power distribution management module that generates a set of power distribution management decision signals, a plurality of internal communication channels and a plurality of external communication ports, wherein:
the DPS diagnosis/prognosis module comprising a subsystem diagnostics auditing module, a DPS diagnostics module, a DPS prognostics module and an offline maintenance module,
the DPS fault tolerance management module comprising a health management module, a fault mitigation module, and a fault tolerance module,
the power distribution management module comprising an efficiency control module, a battery charge balancing module, a thermal balancing module and a power management module,
wherein:
the DPS diagnosis/prognosis module is configured to be in electrical communication with the second controller and configured to transmit the DPS diagnosis/prognosis information to the second controller via electric communication over an external communication port of said third controller, the DPS diagnosis/prognosis module is configured to be in electrical communication with the DPS fault tolerance management module and configured to transmit the DPS diagnosis/prognosis information to the DPS fault tolerance management module via electrical communication over an internal communication channel of said third controller, the DPS diagnosis/prognosis module is configured to receive the system states assessment information signals from the DPS fault tolerance module via electrical communication over an internal communication channel, the DPS fault tolerance management module is configured to be in electrical communication with the DPS diagnosis/prognosis module, said DPS fault tolerance management module is also configured to receive the DPS diagnosis/prognosis information signals from the DPS diagnosis/prognosis module via electrical communication over an internal communication channel, and configured to transmit the system states assessment information signals to the DPS diagnosis/prognosis module via electrical communication over an internal communication channel, the DPS fault tolerance management module is configured to be in electrical communication with the power distribution management module, said DPS fault tolerance management module is configured to receive the power distribution management decision signals from the power distribution management module and configured to transmit the system states management decision signals to the power distribution management module via electrical communication over an internal communication channel of said third controller, and the power distribution management module is configured to be in electrical communication with the DPS fault tolerance module, said power distribution management module is configured to transmit the power distribution management decision signals to the DPS fault tolerance module via electrical communication, said power distribution management module is also configured to receive the system states management decision signals from the DPS fault tolerance module via electrical communication over an internal communication channel within said third controller.

2. The hierarchical vehicle control system for a vehicle as in claim 1 wherein
said distributed power control unit further comprising:
a first external communication port,
a second external communication port,
a third external communication port,
a fourth external communication port,
a fifth external communication port,
a sixth external communication port,
a seventh external communication port, and
an eighth external communication port,
said battery system further comprising:
a BMS/diagnostics module that generates a battery diagnostics code/measurement signal, and
an energy source generator configured to receive a charging control command signal from the power distribution management module,
said motor system further comprising:
a motor control/diagnostics module that generates a motor diagnostics code/measurement signal, and
a motor/clutch set configured to receive a clutch control command from the power distribution management module, wherein
said motor control/diagnostics module is configured to be in electrical communication with the DPS diagnosis/prognosis module and the power distribution module, wherein the motor control/diagnostics module is configured to transmit the motor diagnostics code/measurement signal to the DPS diagnosis/prognosis module via electrical communication, and said motor control/diagnostics module is configured to receive the motor command signals from the power distribution management module via electrical communication,
said BMS/diagnostics module is configured to be in electrical communication with the DPS diagnosis/prognosis module and the power distribution management module, and
said BMS/diagnostics module is configured to transmit the battery diagnostics code/measurement signal to the DPS diagnosis/prognosis module via electrical communication, said BMS/diagnostics module is also configured to receive a battery control command signal from the power distribution management via electrical communication.

3. The hierarchical vehicle control system for a vehicle as in claim 2 wherein the subsystem diagnostics auditing module, the DPS diagnostics module, the DPS prognostics module and the offline maintenance module are configured to be in electrical communication with each other, and
said subsystem diagnostics auditing module is configured to receive a battery diagnostics code signal from the battery diagnostics code/measurement signal via the first external communication port, a motor diagnostics code from the motor diagnostics code/measurement signal via the second external communication port, and
said subsystem diagnostics auditing module is configured to transmit an audited diagnostics information signal to the DPS diagnostics module, the DPS prognostics module and the offline maintenance module via electrical communication, and
configured to transmit the audited diagnostics information signal via the third external communication port.

4. The hierarchical vehicle control system for a vehicle as in claim 3 wherein said DPS diagnostics module is
configured to receive the audited diagnostics information signal from the subsystem diagnostics auditing module via electrical communication,
configured to receive a battery measurement signal from the battery diagnostics code/measurement signal via the first external communication port,
configured to receive a motor measurement from the motor diagnostics code/measurement signal via the second external communication port,
configured to receive a fault mitigation decisions signal and a fault tolerance decisions signal from the system states assessment information signals communication, and
configured to receive an offline check/self-excited diagnostics information signal from the offline maintenance module via electrical communication, and
said DPS diagnostics module is
configured to transmit a DPS diagnostics information signal to the DPS prognostics module, the offline maintenance module via electrical communication, and
configured to transmit the DPS D/P information signals via the third external communication port.

5. The hierarchical vehicle control system for a vehicle as in claim 3 wherein said DPS prognostics module is
- configured to receive the audited diagnostics information signal from the subsystem diagnostics auditing module, a health management decisions signal from the system states assessment information signals communication, the DPS diagnostics information signal from the DPS diagnostics module, the fault mitigation decisions signal from the system states assessment information signals communication, a fault tolerance decisions signal from the system states assessment information signals communication and an offline check/self-excited prognostics information signal from the system states assessment information signals communication, and said DPS prognostics module is
- configured to transmit a DPS prognostics information signal to offline maintenance module via electrical communication, and
- configured to transmit the DPS D/P information signals via the third external communication port.

6. The hierarchical vehicle control system for a vehicle as in claim 3 wherein said offline maintenance module is
- configured to receive the audited diagnostics information signal from the subsystem diagnostics auditing module, the DPS prognostics information signal from the DPS prognostics module, the DPS diagnostics information signal from the DPS diagnostics module, the battery measurement signal from the battery diagnostics code/measurement signal and the motor measurement from the motor diagnostics code/measurement signal via electrical communication, and said offline maintenance module is
- configured to transmit an offline check/self-excited diagnostics information signal to the DPS diagnostics module and the offline check/self-excited prognostics information signal to the DPS prognostics module via electrical communication, and
- configured to transmit the offline check/self-excited prognostics information signal via the third external communication port.

7. The hierarchical vehicle control system for a vehicle as in claim 2 wherein the health management module, the fault mitigation module and the fault tolerance module are configured to be in electrical communication with each other, and
- said health management module is configured to receive an audited diagnostics information signal, a DPS diagnostics information signal, a DPS prognostics information signal, an offline check/self-excited diagnostics information signal and an offline check/self-excited prognostics information signal from the DPS diagnosis/prognosis module via the DPS D/P information signals internal communication, and to receive an efficiency controls decisions signal, a charge balancing decisions signal, a thermal balancing decisions signal and a power management decisions signal from the power distribution management module via a power distribution management decision signals communication, the health management module is also configured to receive a fault mitigation decisions signal from the fault mitigation module, and
- said health management module is further configured to transmit a health state assessment signal to the DPS diagnosis/prognosis module via the system states assessment information signals communication and a health management decisions signal to the power distribution management module via the system states management decision signals communication.

8. The hierarchical vehicle control system for a vehicle as in claim 7 wherein said fault mitigation module is
- configured to receive the audited diagnostics information signal, DPS diagnostics information signal, DPS prognostics information signal, offline check/self-excited diagnostics information signal and offline check/self-excited prognostics information signal from the DPS diagnosis/prognosis module via the DPS D/P information signals internal communication,
- configured to receive the efficiency controls decisions signal, charge balancing decisions signal, thermal balancing decisions signal and power management decisions signal from the power distribution management module via the power distribution management decision signals communication, and
- configured to receive a fault tolerance decisions signal from the fault tolerance module, and said fault mitigation module is further
- configured to transmit a fault mitigation assessment signal to the DPS diagnosis/prognosis module via the system states assessment information signals communication,
- configured to transmit the fault mitigation decisions signal to the health management module, and
- configured to the power distribution management module via the system states management decision signals communication.

9. The hierarchical vehicle control system for a vehicle as in claim 7 wherein said fault tolerance module is
- configured to receive the audited diagnostics information signal, DPS diagnostics information signal and offline check/self-excited diagnostics information signal from the DPS diagnosis/prognosis module via the DPS D/P information signals internal communication,
- configured to receive the efficiency controls decisions signal, charge balancing decisions signal, thermal balancing decisions signal and power management decisions signal from the power distribution management module via the power distribution management decision signals communication,
- configured to transmit a fault tolerance decisions signal to the fault mitigation module via the system states management decision signals communication,
- configured to transmit the fault tolerance decisions signal to the power distribution management module via the system states management decision signals communication, and
- configured to transmit a fault tolerance assessment signal to the DPS diagnosis/prognosis module via the system states assessment information signals communication.

10. The hierarchical vehicle control system for a vehicle as in claim 2 wherein the efficiency control module, the battery charge balancing module, the thermal balancing module and the power management module are configured to be in electrical communication with each other, and said efficiency control module is
- configured to receive an axle speed command from the fourth external communication port,
- configured to receive a health management decisions signal, a fault mitigation decisions signal and a fault tolerance decisions signal from the DPS fault tolerance management module via the system states management decision signals communication,
- configured to receive a power management decisions signal from the power management module, configured to transmit an efficiency controls decisions signal to power management module, and configured to transmit the efficiency controls decisions signal to DPS fault tolerance management module via the power distribution management decision signals communication.

11. The hierarchical vehicle control system for a vehicle as in claim 10 wherein said battery charge balancing module is configured to receive an axle speed command from the fourth external communication port, configured to receive the health management decisions signal, the fault mitigation decisions signal and the fault tolerance decisions signal from the DPS fault tolerance management module via the system states management decision signals communication, configured to receive a power management decisions signal from the power management module, configured to transmit a charge balancing decisions signal to the power management module, and configured to transmit the charge balancing decisions signal to the DPS fault tolerance management module via the power distribution management decision signals communication.

12. The hierarchical vehicle control system for a vehicle as in claim 10 wherein said thermal balancing module is configured to receive an axle speed command from the fourth external communication port, configured to receive the health management decisions signal, the fault mitigation decisions signal and the fault tolerance decisions signal from the DPS fault tolerance management module via the system states management decision signals communication, and configured to receive a power management decisions signal from the power management module via electrical communication, and said thermal balancing module is further configured to transmit a thermal balancing decisions signal to the power management module via electrical communication, and configured to transmit the thermal balancing decisions signal to the DPS fault tolerance management module via the power distribution management decision signals communication.

13. The hierarchical vehicle control system for a vehicle as in claim 10 wherein said power management module is configured to receive an axle speed command from the fourth external communication port, configured to receive the health management decisions signal, the fault mitigation decisions signal and the fault tolerance decisions signal from the DPS fault tolerance management module via the system states management decision signals communication, and configured to receive the efficiency controls decisions signal from the efficiency control module, the charge balancing decisions signal from the battery charge balancing module and the thermal balancing decisions signal from the thermal balancing module via electrical communication, and said power management module is further configured to transmit a battery control command signal to the fifth external communication port, configured to transmit a motor speed control signal to the sixth external communication port, configured to transmit a clutch control command to the seventh external communication port, configured to transmit a power management decisions signal to the efficiency control module, the battery charge balancing module and the thermal balancing module via electrical communication, and configured to transmit a charging control command signal to the eighth external communication port.

14. The hierarchical vehicle control system for a vehicle as in claim 1 wherein the second controller and the third controller are configured to be in one hardware assembly and there is no external communication port connected between the second controller and the third controller.

15. The hierarchical vehicle control system for a vehicle as in claim 1 wherein the third controller further comprising a BMS/diagnostics module that generates a battery diagnostics code/measurement signal, and configured in one hardware assembly with the BMS/diagnostics module wherein there is no external communication port connected between the third controller and the BMS/diagnostics module.

* * * * *